United States Patent [19]
Liu et al.

[11] Patent Number: 5,662,569
[45] Date of Patent: Sep. 2, 1997

[54] STEPPING APPARATUS CAPABLE OF LARGE ANGLE OSCILLATION

[76] Inventors: Chun-Hsien Liu, 3F, 20, Lane 65, Hsiao-San Rd.,, Keelung; Ching-Huan Tseng, 2-30, Bo-Ai St., Lui-Shuei Li, Hsinchu, both of Taiwan

[21] Appl. No.: 697,294

[22] Filed: Aug. 26, 1996

[51] Int. Cl.$^6$ .............................. B23Q 3/157; B66C 3/00; G05G 1/00
[52] U.S. Cl. .............................. 483/38; 74/569; 414/738; 483/44
[58] Field of Search ................... 483/38, 44, 45, 483/39, 40, 41, 46; 74/820, 567, 569, 84 R; 414/735, 736, 744.2

[56] References Cited

U.S. PATENT DOCUMENTS

| | | | |
|---|---|---|---|
| 2,986,949 | 6/1961 | Lancaster et al. | 74/820 |
| 3,969,954 | 7/1976 | Dehne | 74/569 |
| 4,416,165 | 11/1983 | Kramer et al. | 74/70 |
| 4,599,909 | 7/1986 | Koler | 74/567 |
| 4,768,396 | 9/1988 | Takahashi | 74/567 |
| 4,833,722 | 5/1989 | Kobayashi | 483/44 |
| 5,081,762 | 1/1992 | Kin | 483/44 |
| 5,424,621 | 6/1995 | Hwang | 483/44 |

*Primary Examiner*—William R. Briggs
*Attorney, Agent, or Firm*—Ladas & Parry

[57] ABSTRACT

A stepping apparatus capable of large angle oscillation comprising an output shaft and a driving shaft arranged parallel to, and spaced apart from, each other wherein the output shaft is provided with a roller wheel plate, both sides of the wheel plate being pivoted with a plurality of alternately spaced rollers, a pair of plate cams being secured on the driving shaft for driving in combination with the rollers on both sides of the wheel plate, allowing the driving shaft to drive the output shaft for reverse angular rotation, standstill, forward angular rotation, indexing, and other stepping sequential operations. Said plate cams remain in camming contact with at least two rollers, causing them to be positioned on the opposite sides of the line connecting between the driving shaft and the output shaft for positive driving between the cams and the rollers, characterized in that during the sequential operation of reverse angular rotation, the two rollers remaining in positive driving with the plate cams are offset for an angle θ (for example, 30 degrees) with respect to the line connecting the driving shaft and the output shaft such that the output shaft can be oscillated for large angles of more than 45 degrees (for example, 65 degrees) when the two rollers remain in positive driving with the plate cams.

5 Claims, 9 Drawing Sheets

STEPPING APPARATUS CAPABLE OF LARGE ANGLE OSCILLATION

BACKGROUND OF THE INVENTION

The present invention relates to a stepping apparatus capable of large angle oscillation and, in particular, to an angular stepping apparatus particularly suitable for automatic tool changing wherein an output shaft secured on a roller wheel plate is allowed to oscillate for large angles by a pair of parallel plate cams in combination with a plurality of rollers provided on the wheel plate.

Automatic processing machineries enable automatic changing of tools between a main spindle and a tool magazine by using an apparatus known as the automatic tool changer (ATC). As shown in FIGS. 1A through 1F, the operation of the ATC mainly comprises the sequential movements of tool-grasping, tool-drawing, tool-changing, tool-loading, returning to position and coming into standby.

FIGS. 1A–1F are schematic views showing the sequential movements during operation of the ATC. In the illustrated ATC, an output shaft O is secured at one end thereof with a swing arm L having tool holding claws A and B which mate, respectively, with the tools on the main spindle S and the tool magazine M to perform the tool changing operation.

Figure 1A:
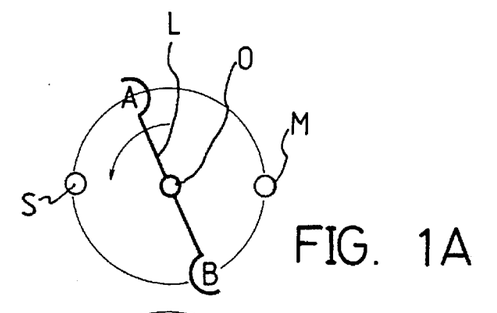
FIG. 1A is a schematic view of the "tool-grasping operation" of an automatic tool changer (ATC), showing that the tool holding claws A and B of the swing arm L are rotating an angle counterclockwise from a standby position to approach the main spindle S and the tool magazine M, causing the claws A and B to grasp the tools respectively on the main spindle S and the tool magazine M.

FIG. 1A is a schematic view showing the swing arm L in a standby position. When starting the automatic tool changing operation, the output shaft O rotates the swing arm L from its initial stationary condition to perform the tool-grasping operation, bringing it from the "standby" position into a "tool drawing" position as shown in FIG. 1B, and causing the tool holding claws A and B to grasp the tools on the main spindle S and the tool magazine M to perform the "tool-grasping operation".

Figure 1B:
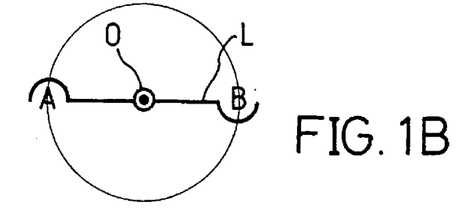
FIG. 1B is a schematic view of the "tool-drawing operation" of the automatic tool changer, showing that the tool holding claws A and B have grasped the tools on the main spindle S and the tool magazine M, respectively, and moved axially outwardly to draw the tools out of the main spindle S and the tool magazine M.

FIG. 1B is a schematic view showing the swing arm L in the "tool-drawing" position. After the tool holding claws A and B caught the tools on the main spindle S and the tool magazine M, respectively, the output shaft O moves axially outwardly to remove the tools, respectively, from the main spindle S and the tool magazine M, thereby to accomplish a "tool drawing" operation.

Figure 1C:
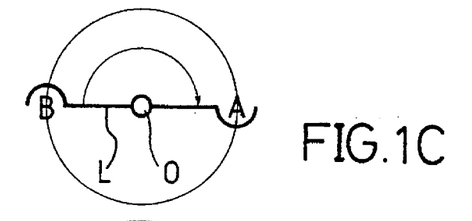
FIG. 1C is a schematic view of the "tool-changing operation" of the automatic tool changer, showing that the output shaft O rotates 180 degrees to change the positions of the tool holding claws A and B with respect to each other.

FIG. 1C is a schematic view showing the "tool-changing" operation. After the tools on the main spindle S and the tool magazine M are withdrawn, the swing arm L rotates 180 degrees such that the tool claws A and B each change its place with the other, causing the tool removed from the tool magazine M to be changed with the tool on the main spindle S.

Figure 1D:
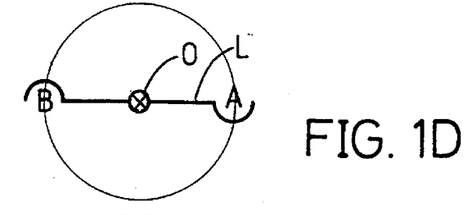
FIG. 1D is a schematic view of the "tool-loading operation" of the automatic tool changer, showing that the output shaft O moves axially inwardly to load the tools grasped by the tool holding claws A and B onto the main spindle S and the tool magazine M, respectively.

FIG. 1D is a schematic view showing the "tool-loading" operation. At this point, the output shaft O is moved axially inwardly after the "tool-changing" operation such that the tools in the claws B and A are loaded on the main spindle S and the tool magazine M, respectively.

Figure 1E:
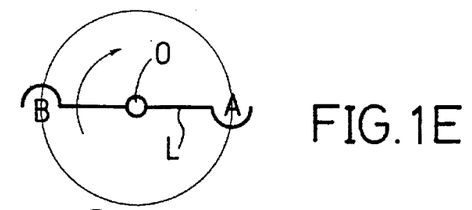
FIG. 1E is a schematic view of the "returning to position operation" of the automatic tool changer, showing that the swing arm L is about to rotate an angle clockwise to oscillate back to its standby position after the tools having been placed onto the main spindle S and the tool magazine M.
Figure 1F:
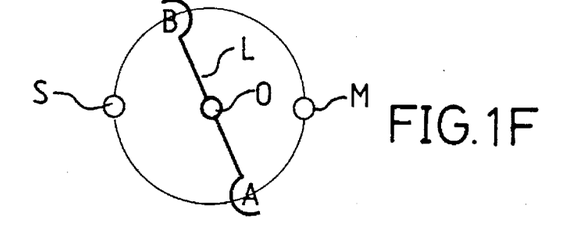
FIG. 1F is a schematic view showing the swing arm L of the automatic tool changer being in the "standby position"

FIG. 1E is a schematic view showing that the swing arm L is ready to perform the "returning to position" operation. After the tools are loaded, respectively, on the main spindle S and the tool magazine M by the swing arm L, the arm L rotates an angle, and returns to its "standby" position (as shown in FIG. 1F), thus being ready for the next cycle of the automatic tool changing operations.

Instead of the earlier time-consuming tool changing operations by the hydraulic driving system, conventional ATC's recently tend to use a so-called "roller gear cam" to perform the oscillating and indexing of the swing arm in the tool changing operations, and to perform the axially upward and downward movements of the swing arm in the tool changing operations by using a grooved cam in association with link means. For example, Japanese New Utility Model Laid-Open Sho 63-113530 discloses an ATC employing a roller gear cam and plate cams. While such a changer achieves the operations and the purpose of the automatic tool changers, the roller gear cams as employed are cams of the three-dimensional type which are expensive to manufacture and not easy to have the required tolerance. In addition, the oscillating movements of the link driven by the grooved cam results in non-positive driving therebetween, thus causing loss of the benefits of the positive driving by using the roller gear cams.

In conventional parallel indexing cam structure, for example, the "Indexing Cam Structure" disclosed in U.S. Pat. No. 2,986,949 issued to Edward W. Lancaster, et al, Jun. 6, 1961, although stepping indexed positioning operation can be achieved by using a pair of parallel or juxtaposed plate cams driving a roller wheel plate (i.e., a wheel plate alternatively and pivotally provided on both sides with a number of rollers), said indexing cam structure enables its output shaft (i.e., the shaft of the roller wheel plate) to step forward in time-sequence only in one direction of rotation but the output shaft is incapable of effecting reverse rotational movement, thus impossible for the output shaft to effect an oscillating movement. As a result, said parallel indexing cam structure can not provide the movements for the tool grasping and returning to position operations, and thus is unstable for the automatic tool changers.

U.S. Pat. No. 4,416,165 issued to Kramer, et al, Nov. 22, 1983, discloses a "Stepping Gear" in which a pair of coaxially juxtaposed plate cams are used for driving a roller wheel plate having a number of rollers. Said stepping gear, being a parallel indexing cams structure, provides accurate indexed forward movement and the output shaft of the roller wheel plate is capable of reverse movement by having undercut in one of the cams. However, said stepping gear is basically an indexing mechanism providing very small oscillating angles in reverse movement such that it is suitable only for packaging operations by the packaging machines. Said stepping gear for maintaining positive driving between the cams and the rollers does not provide the oscillating angles required for the "tool grasping" and "returning to position" operations in a automatic tool changer. In particular, some recently developed automatic tool changers require oscillating angles of more than 45 degrees for automatic tool changing operations. Said conventional stepping gears are thus becoming even more unsuitable for use in the automatic tool changers.

U.S. Pat. No. 4,833,772 issued to Mitsuo Kobayashi, et al, May 30, 1989, discloses an "Automatic Tool Changing Apparatus" in which a cam index mechanism for rotating a swing arm by using a pair of juxtaposed plate cams driving a roller wheel plate is in fact an application of the stepping gear disclosed in the aforementioned U.S. Pat. No. 4,416,165. Said mechanism is basically a conventional parallel indexing cam structure and provides only an indexed positioning function. Said mechanism is basically a conventional parallel indexing cam structure and provides only an indexed positioning function such that it is impossible for its output shaft to oscillate in reverse movement but to provide a forward stepping rotation.

SUMMARY OF THE INVENTION

Accordingly, an object of the present invention is to provide a plate cam stepping apparatus of the positive driving type which is simple in structure and inexpensive to manufacture, which provides oscillating movement of large angles with accurate control, and which is particularly suitable for use in automatic tool changers, comprising an output shaft and a driving shaft arranged parallel to, and spaced apart from, each other wherein the output shaft is provided with a roller wheel plate, both sides of the wheel plate being alternatively pivoted with a plurality of spaced rollers, a pair of parallel plate cams being axially juxtaposed on the driving shaft for driving in combination with the rollers on both sides of the wheel plate, allowing the driving shaft to drive the output shaft in the same direction for oscillation, dwell, indexing, and other stepping sequential movements. Said plate cams remain in camming contact with at least two rollers, causing them to be respectively located on the opposite sides of a line connecting the axes of the driving shaft and the output shaft for positive driving, characterized in that in the standby position, the two rollers remaining in positive driving with the plate cams are offset for an angle θ (for example, 30 degrees) with respect to the line connecting the axes of the driving shaft and the output shaft such that the output shaft can be oscillated for large angles of more than 45 degrees (for example, 65 degrees) and when the two rollers remain in positive driving with the plate cams.

BRIEF DESCRIPTION OF THE DRAWINGS

Other objects, features, and advantages of the present invention will become apparent from the following detailed description of the preferred embodiments with reference to the accompanying drawings.

DETAILED DESCRIPTION OF THE PREFERRED EMBODIMENT

Figure 2:
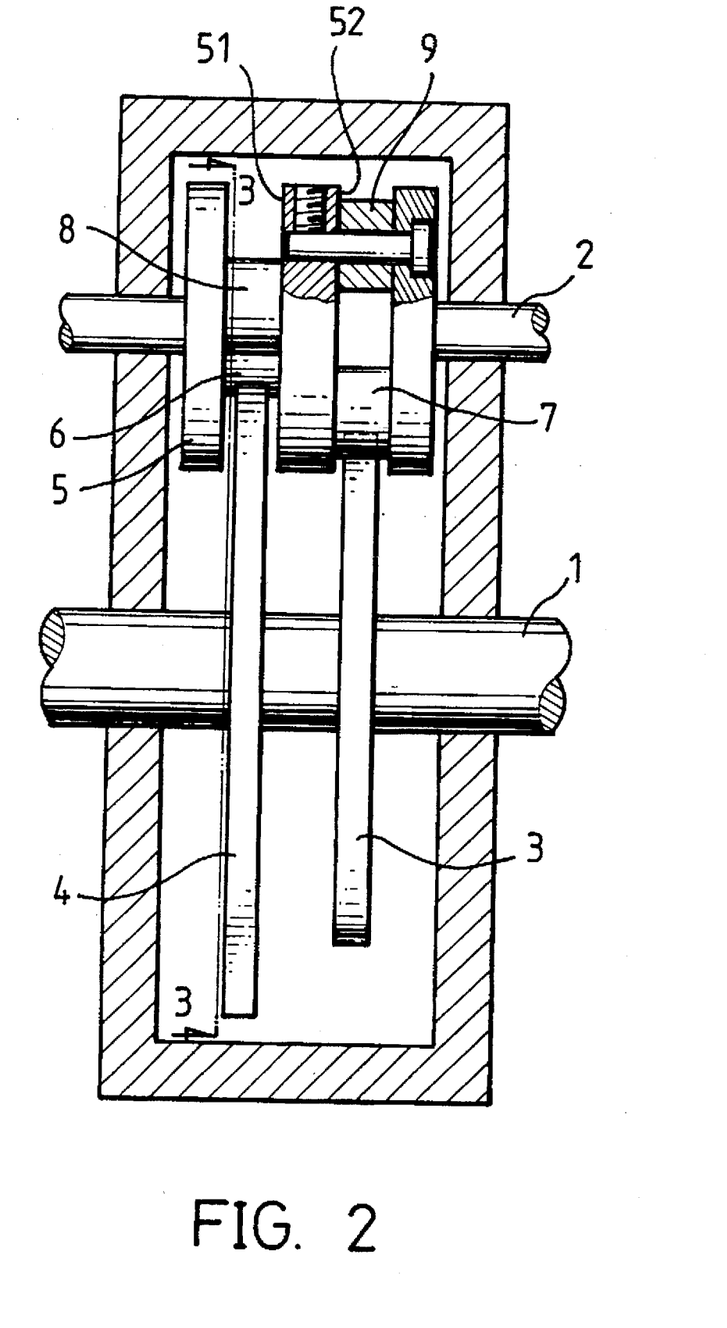
FIG. 2 is schematically cross-sectional view of the present invention, showing the relative spatial configuration of the plate cams and the rollers.
Figure 3:
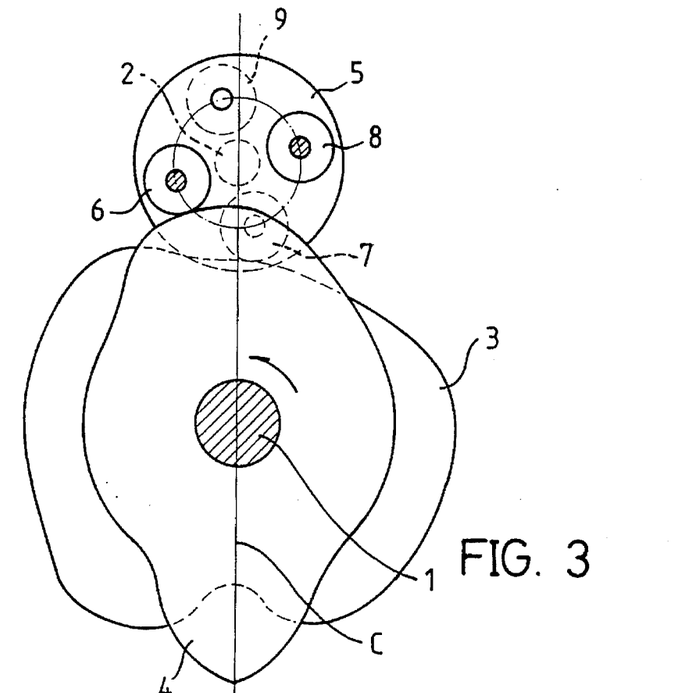
FIG. 3 is schematically cross-sectional view taken along the line 3—3 of FIG. 2, showing that one preferred embodiment of the plate cams and rollers of the stepping apparatus of the present invention are in a position corresponding to the "standby position" of an automatic tool changer (as illustrated in FIG. 1F), in which the driving shaft is rotating clockwise and the output shaft stays still ready for the subsequent tool grasping operation (as shown in FIG. 1A)
Figure 4:
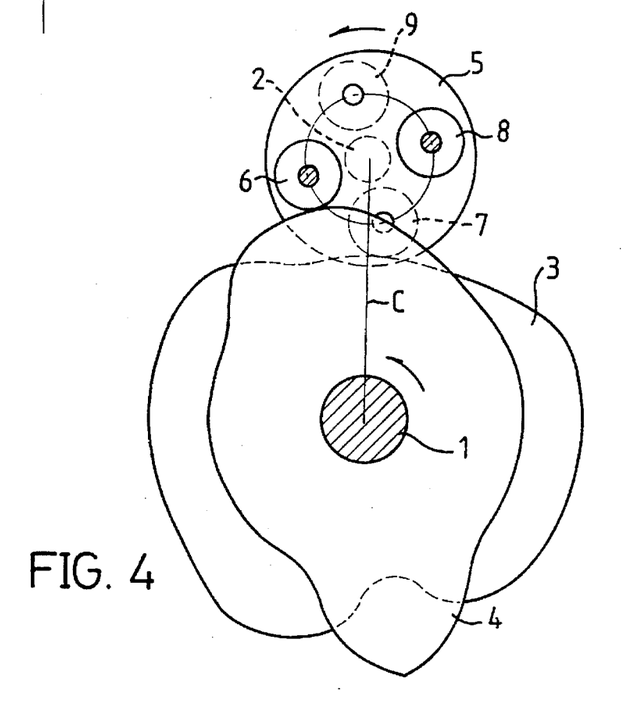
FIG. 4 is a schematic view showing that the plate cams and roller of the present invention are in a position corresponding to the "tool-grasping position" of the automatic tool changer (as illustrated in FIG. 1A), in which the output shaft is about to rotate 65 degree counterclockwise to perform the "tool-grasping operation"
Figure 5:
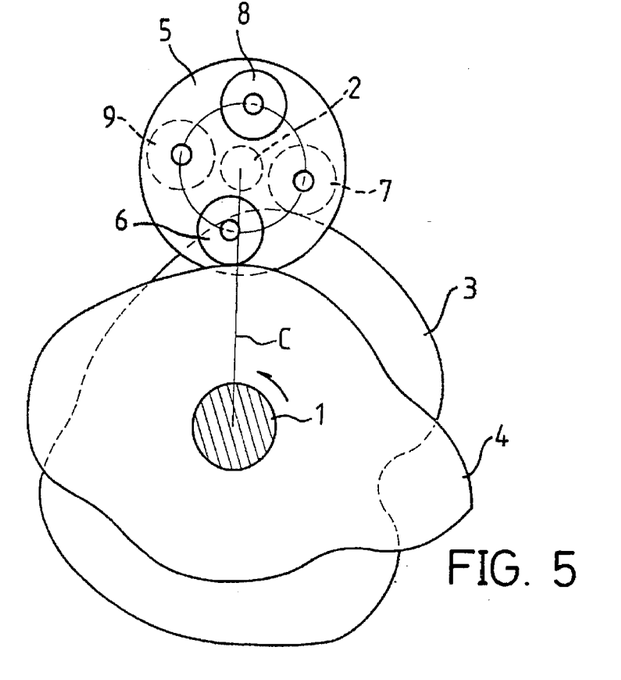
FIG. 5 is a schematic view showing that the plate cams and rollers of the present invention are in a position for performing the "tool-drawing position" of the automatic tool changer (as illustrated in FIG. 1B); in which the output shaft is in a standstill phase and the driving shaft is rotating.
Figure 6:
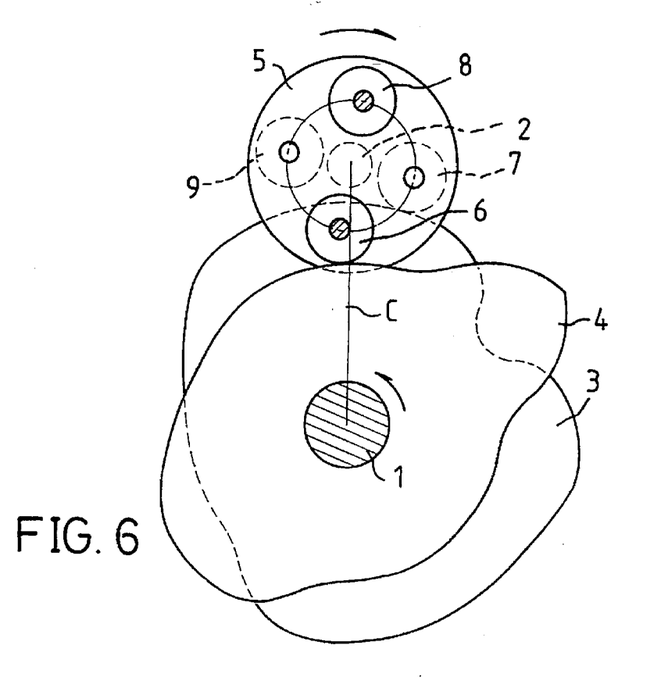
FIG. 6 is a schematic view showing that the plate cams and rollers of the present invention are in a position for performing the "tool-changing operation" of the automatic tool changer, in which the rollers are driven by the plate cams so that the output shaft is about to rotate 180 degrees clockwise.
Figure 7:
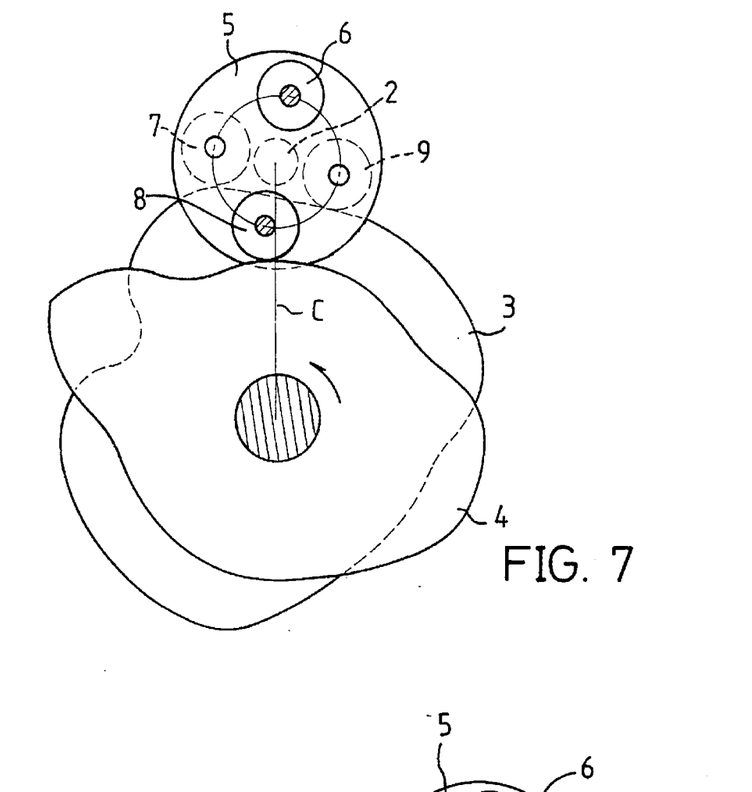
FIG. 7 is a schematic view showing that the plate cams and rollers of the present invention are in a position for performing the "tool-loading operation" of the automatic tool changer, in which the output shaft is in a standstill phase and the driving shaft is rotating.
Figure 8:
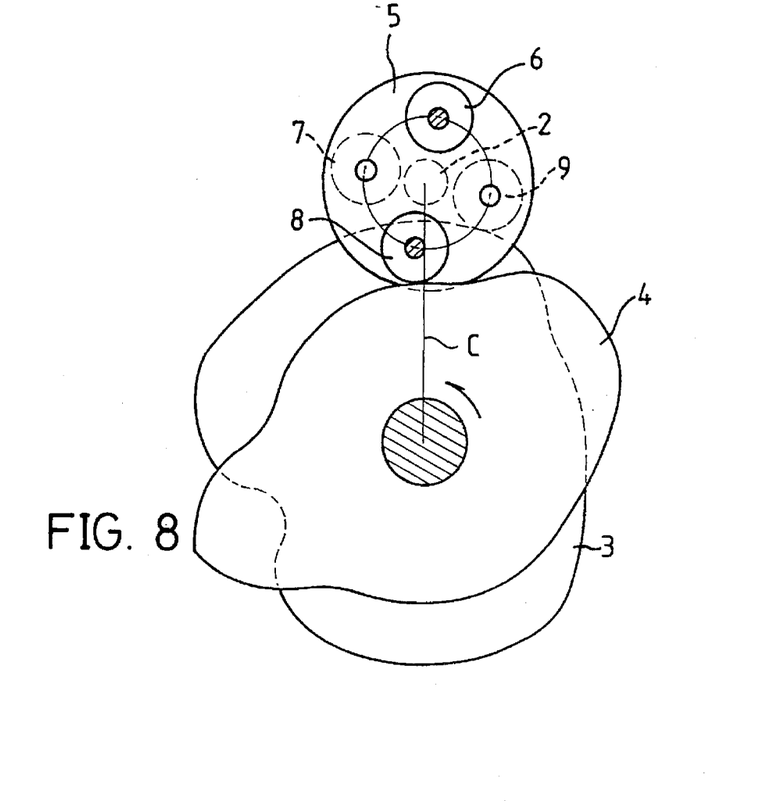
FIG. 8 is a schematic view showing that the plate cams and rollers of the present invention are in a position for performing the "returning to position operation" of the automatic tool changer, in which the rollers are driven by the plate cams so that the output shaft is about to clockwise rotate an angle, e.g., 65 degrees, to return the "standby position" as illustrated in FIG. 1F.
Figure 9:
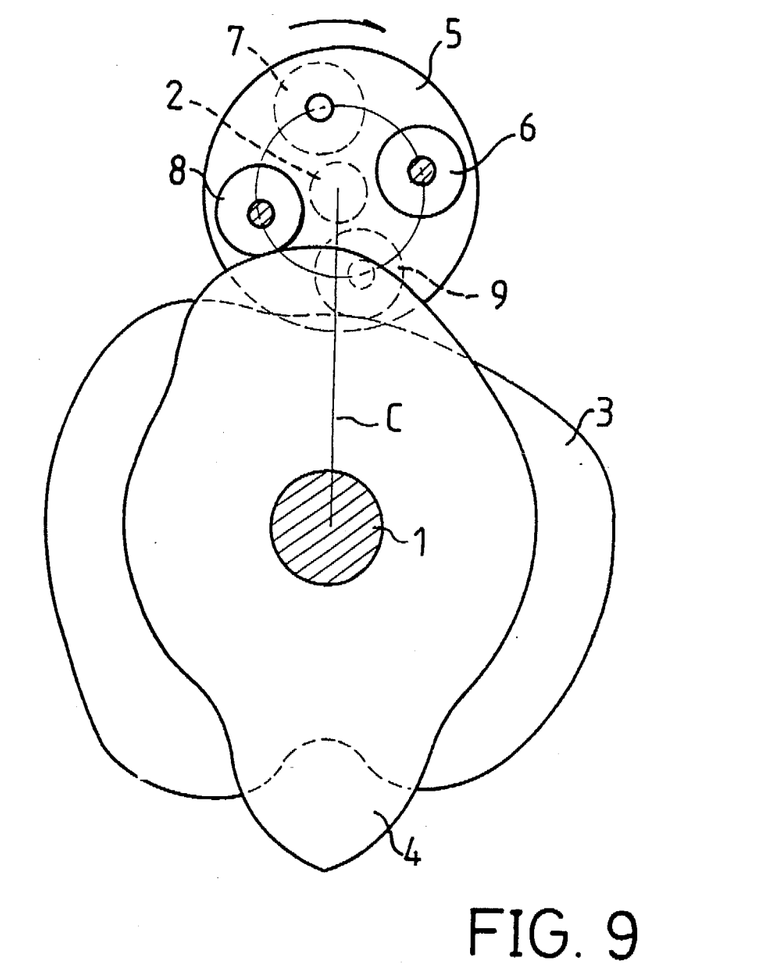
FIG. 9 is a schematic view showing that the plate cams and rollers of the present invention are in a position for performing the "standby operation" of the automatic toll changer as illustrated in FIG. 1F, in which the output shaft has returned to the "standby position"

As shown in FIGS. 2 and 3, one preferred embodiment of a stepping apparatus capable of large angle oscillation in accordance with the present invention comprises a driving shaft 1, an output shaft 2, a pair of plate cams 3 and 4, and a roller wheel plate 5 with four rollers 6, 7, 8, and 9 wherein the driving shaft 1 is parallel to the output shaft 2, the pair of the cams 3 and 4 being coaxially juxtaposed on the driving shaft 1. The roller wheel plate 5 has two sides 51 and 52 and is secured to the output shaft 2.

The four rollers 6, 7, 8, and 9 are alternatively pivoted spaced apart on the opposite sides 51 and 52 of the roller wheel plate 5 for fitting with the plate cams 3 and 4 so as to rotate the output shaft 2 through the driving by the rollers 6, 7, 8, and 9 when the plate cams 3 and 4 are rotated by the driving shaft 1.

As shown in FIGS. 2 through 9, the two plate cams 3 and 4, in any position, remain in camming contact with at least two adjacent rollers of the rollers 6, 7, 8, and 9. The two rollers, which are contacting with the cams 3 and 4, are located at the opposite sides of a line C connecting the between the axes of the output shaft 2 and driving shaft 1, so as to keep the rollers in positive driving with the plate cams 3 and 4. In this preferred embodiment the subtend angle between every two adjacent rollers is 90 degrees.

Figure 10:
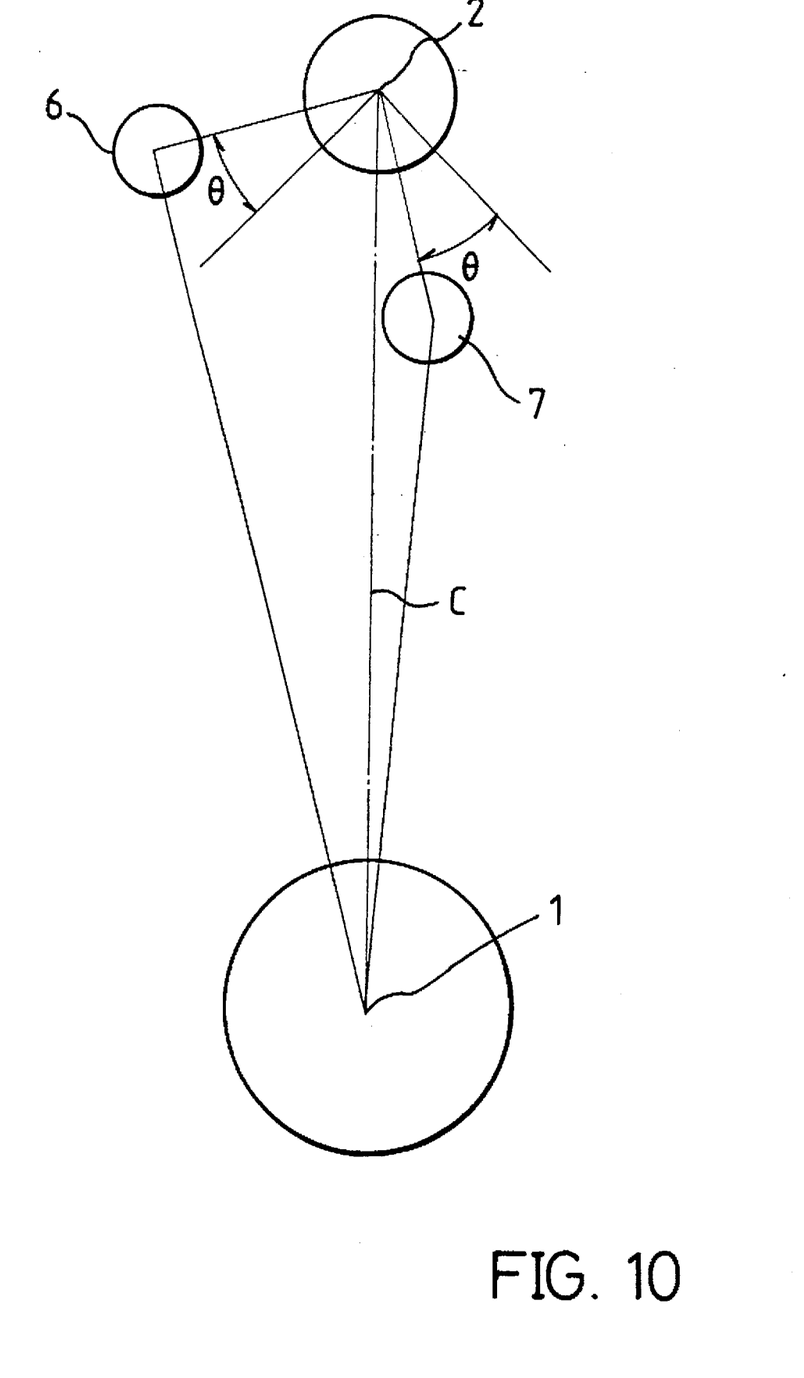
FIG. 10 is a schematic view for the offset angle in the stepping apparatus of the present invention, showing that in the standby position, the relative position of the rollers remaining in locking engagement with the two cams with respect to the line C connecting the output shaft and the driving shaft.

Referring now to FIG. 10, with the angle of 90 degrees between the two adjacent rollers, if the rollers are not offset, each of the two adjacent rollers subtends an angle of 45 degrees with the line C. As a result, when the roller 6 moves counterclockwise for more than 45 degrees, the rollers 6 and 7 will be located on the same side of the line C connecting between the output shaft 2 and the driving shaft 1, thus resulting in a "non-positive driving" with the cams 3 and 4. The term "offset" as used herein refers to changing the profiles of the cams such that the rollers in camming contact therewith are offset an angle θ (for example 35 degrees) with respect to the line C connecting the output shaft 2 and the driving shaft 1.

Figure 11:
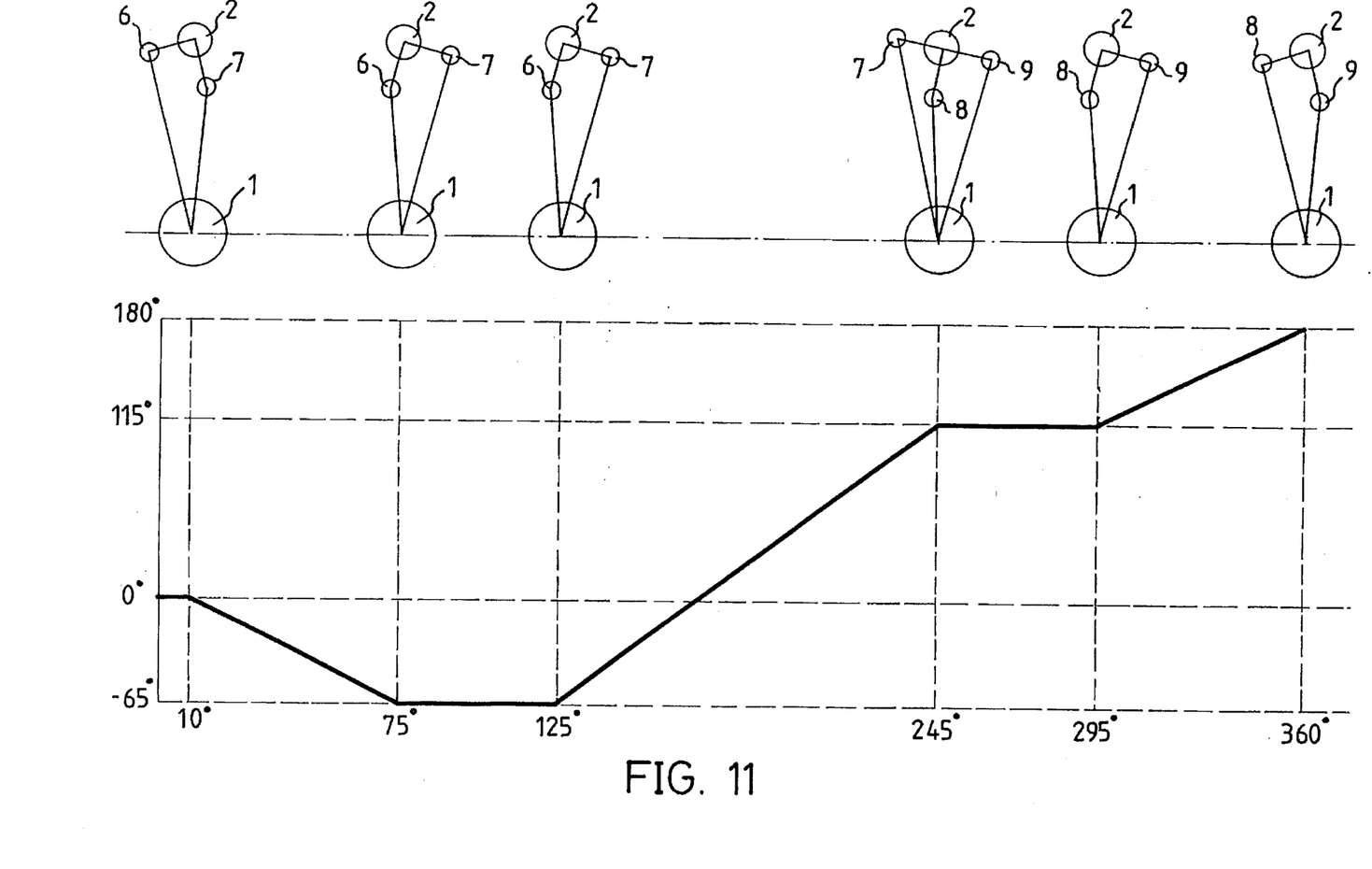
FIG. 11 is a timed-sequential operation diagram of the angle of rotation of the rollers and the cams in the preferred embodiment of the present invention, showing the angular relation of rotation between the rollers and the cams during various operation phases.

As shown in FIGS. 3, 10 and 11, since the rollers such as rollers 6 and 7 are previously offset an angle θ (for example 35 degrees) with respect to the connecting line C, when the roller 6 is driven by the cam 4 to rotate counterclockwise for 65 degrees (greater than 45 degrees), the rollers 6 and 7 are still located on two opposite sides of the line C connecting the output shaft 2 and the driving shaft 1 such that the rollers 6 and 7 can still maintain positive driving with the cams 3 and 4.

As shown in FIGS. 1A through 1F and FIGS. 2 through 9, the two cams 3 and 4 of the stepping apparatus of the present invention are formed with specially designed profiles such that in combination with the rollers 6, 7, 8, and 9 on the roller wheel plate 5, the output shaft 2 can be caused to perform the timed-sequential operations such as reverse rotation, dwell, and forward rotation, and thus are particularly suitable for use in angular rotation control for the output shaft of the automatic tool changer.

As particularly shown in FIGS. 11 and 1A through 1F, when the stepping apparatus of the present invention is used with the automatic tool changer, the driving shaft 1 drives the cams 3 and 4 to gradually rotate for 10 degrees and then for another 65 degrees such that the output shaft 2 will first remain stationary and then rotate counterclockwise for 65 degrees from the initial stationary standby position (as shown in FIG. 1A) to perform the tool-grasping operation. When the driving shaft 1 continues to rotate for 50 degrees to drive the output shaft 2, the output shaft 2 remains standstill in the original position for the automatic tool changer to perform the tool-drawing operation. Then the driving shaft 1 continues to rotate for 120 degrees and the output shaft 2 correspondingly rotates clockwise for 180 degrees for the automatic tool changer to perform the tool-changing operation (as shown in FIG. 1C).

When the tool-changing operation is completed, the driving shaft 1 continues to rotate for 50 degrees and the output shaft 2 remains standstill in the original position for the automatic tool changer to perform the tool-loading operation (as shown in FIG. 1D). When the tool-loading operation is completed, the driving shaft 1 continues to rotate for 65 degrees, causing the output shaft 2 to rotate clockwise for 65 degrees to return to the standby position of the automatic tool changer (as shown in FIG. 1F).

As shown in FIG. 10, the rollers 6 and 7 have an offset angle θ with respect to the line C connecting the output shaft 2 and the driving shaft 1 such that the stepping apparatus of the present invention is capable of providing stepping operations not only in the forward angular rotation and standstill modes but also in the reverse angular rotation mode (opposite in direction to the forward rotation). In particular, the angle of the reverse rotation can be greater than 45 degrees, thus allowing the output shaft to perform a large angle oscillation while still maintain in positive driving between the rollers and the cams. Therefore, the stepping apparatus of the present invention is particularly suitable for use in stepping operation modes where a large angle oscillation is required.

Figure 12:
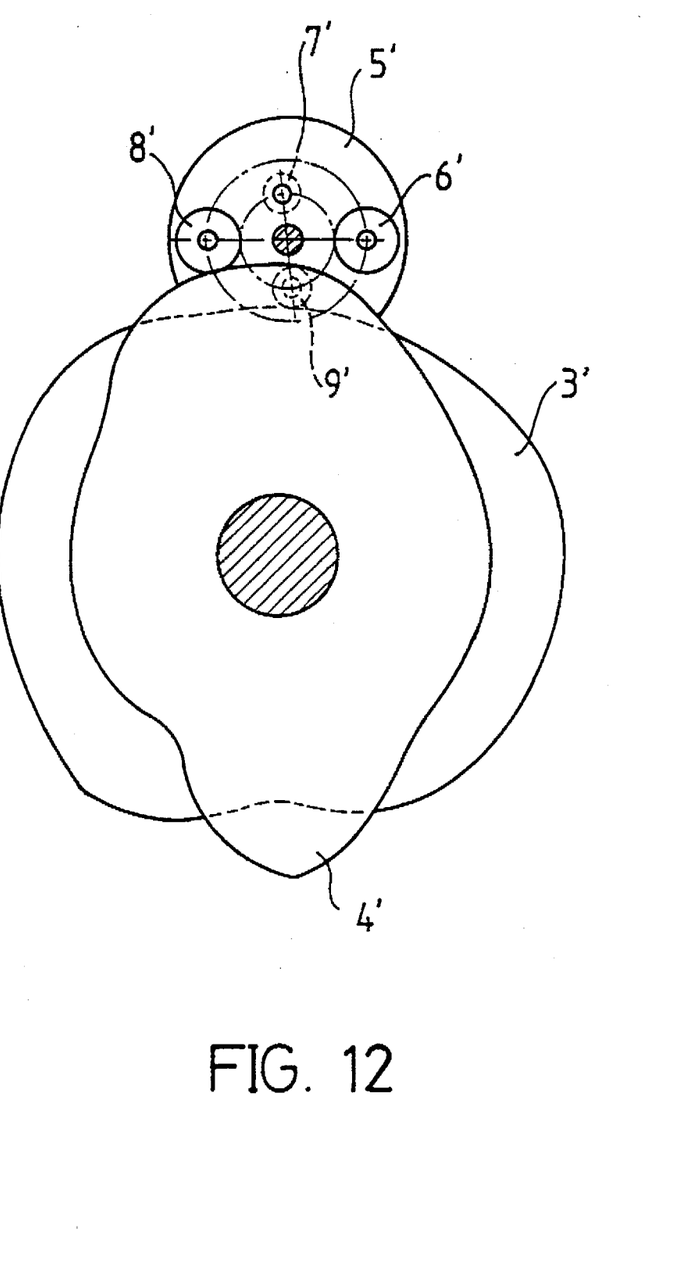
FIG. 12 is a schematically cross-sectional view, similar with FIG. 3, showing another preferred embodiment of the plate cams and rollers of the stepping apparatus of the present invention, in which the four rollers of different sizes in diameter are alternatively pivoted at different angular pitches on both sides of the wheel plate, and the distance between two rollers on one side of the wheel plate is different from the distance between two rollers on the other side of the wheel plate.

Referring to FIG. 12 which illustrates another preferred embodiment of the plate cams and rollers of the stepping apparatus of the present invention, four rollers 6', 7', 8' and 9' are alternatively pivoted at different angular pitches on the both sides of the roller wheel plate 5'. The four roller 6', 7', 8', and 9' are of different sizes in diameter, and the distance between the two roller 6' and 8' on one side of the roller wheel plate 5' is different from the distance between the roller 7' and 9' on the other side of the roller wheel plate 5'.

The stepping apparatus of the present invention is not limited to use in the automatic tool changer. The stepping apparatus capable of large angle oscillation of the present invention can be utilized in any timed-sequential operation mode requiring large angle oscillation (forward and reverse rotations). For use in various timed-sequential operations, changes can be made to the profiles of the two cams for changes into different timed-sequential operation modes in view of the above description by those skilled in the art without departing from the scope of the present invention. In particular, the offset angle used in the present invention can be in range from 5 to 40 degrees, as desired, with respect to the line C connecting the output shaft 2 and the driving shaft 1 so as to obtain increased oscillation.

What is claimed is:

1. A stepping apparatus capable of large angle oscillation comprising:

a driving shaft connected to a power source for generating rotating force;

an output shaft spaced parallel to the driving shaft;

first and second plate cams coaxially juxtaposed on the driving shaft;

roller wheel plate having first and second sides, and centrally disposed on the output shaft; and a plurality of rollers rotatably mounted and circumferentially alternately spaced on the first and second sides for driving in combination with the first and second plate cams, respectively; wherein the profiles of the first and second cams are formed with sections for the output shaft to perform dwell, forward angular rotation and reverse angular rotation in combination with the rollers, and any two adjacent rollers in camming contact with the cams are located on the opposite sides of the line connecting between the driving shaft and the output shaft so as to maintain in positive driving with the cams; characterized in that in the initial standby position, the two adjacent rollers maintaining in positive driving with the cams are offset for an angle θ with respect to the line connecting between the driving shaft and the output shaft such that the output shaft can have large oscillating angles with the rollers not moving across said connecting line and maintaining in positive driving.

2. The stepping apparatus according to claim 1 wherein four rollers are alternately provided at uniform angular pitches on the first and second sides of the roller wheel plate with an included angle of 90 degrees existing between every two adjacent rollers.

3. The stepping apparatus according to claim 2 wherein the offset angle θ is in the range from 5 to 40 degrees and the oscillating angle of the output shaft is in the range from 45 to 80 degrees.

4. The stepping apparatus according to claim 1 wherein four rollers are alternately provided at different angular pitches on the first and second sides of the roller wheel plate.

5. The stepping apparatus according to claim 4 wherein the four rollers are of different sizes in diameter, and the distance between two rollers on the first side of the roller wheel plate is different from the distance between two rollers on the second side of the roller wheel plate.

* * * * *